United States Patent
Bzdusek et al.

(10) Patent No.: US 9,430,831 B2
(45) Date of Patent: Aug. 30, 2016

(54) CORRELATED IMAGE MAPPING POINTER

(75) Inventors: Karl Antonin Bzdusek, Madison, WI (US); Carl Graham Rowbottom, Heald Green (GB); Nicholas Gordon Lance Hardcastle, Clifton Hill, NH (US); Jeffrey Vincent Siebers, Richmond, VA (US)

(73) Assignees: KONINKLIJKE PHILIPS N.V., Eindhoven (NL); WISCONSIN ALUMNI RESEARCH FOUNDATION, Madison, WI (US)

( * ) Notice: Subject to any disclaimer, the term of this patent is extended or adjusted under 35 U.S.C. 154(b) by 412 days.

(21) Appl. No.: 14/004,513

(22) PCT Filed: Mar. 8, 2012

(86) PCT No.: PCT/IB2012/051084
§ 371 (c)(1),
(2), (4) Date: Oct. 29, 2013

(87) PCT Pub. No.: WO2012/123861
PCT Pub. Date: Sep. 20, 2012

(65) Prior Publication Data
US 2014/0049555 A1  Feb. 20, 2014

Related U.S. Application Data

(60) Provisional application No. 61/452,802, filed on Mar. 15, 2011.

(51) Int. Cl.
G06T 7/00 (2006.01)
(52) U.S. Cl.
CPC .......... *G06T 7/0014* (2013.01); *G06T 7/0024* (2013.01); *G06T 7/0083* (2013.01); *G06T 2200/24* (2013.01); *G06T 2207/20212* (2013.01)

(58) Field of Classification Search
None
See application file for complete search history.

(56) References Cited

U.S. PATENT DOCUMENTS 5,926,568 A  7/1999 Chaney et al.
6,111,983 A  8/2000 Fenster et al.
(Continued)

FOREIGN PATENT DOCUMENTS

WO  2010/113050  10/2010

OTHER PUBLICATIONS

Envi; Li, et al.; Remote Sensing Image Processing Course; Beijing, China Environmental Science Press; Feb. 2007.
(Continued)

*Primary Examiner* — James A Thompson

(57) ABSTRACT

A system (106) visualizing an image registration mapping in an intuitive interactive manner. The system (106) includes a display (110) and one or more processors (116). The processors (116) are programmed to receive a first image and a second image and obtain an image registration mapping from the first image to the second image. Even more, the processors (116) are programmed to display the first image adjacent to the second image on the display (110) and obtain one or more reference image locations. Each of the reference image locations is defined in the coordinate frame of one of the first image and the second image. Moreover, the processors (116) are programmed to highlight each of the reference image locations on the one of the first image and the second image and highlight a correlated image location for each of the reference image locations in the other one of the first image and the second image. The correlated image locations are determined using the image registration mapping.

20 Claims, 3 Drawing Sheets

(56) References Cited

U.S. PATENT DOCUMENTS

| | | |
|---|---|---|
| 7,460,733 B2 | 12/2008 | Xiao et al. |
| 7,848,592 B2 | 12/2010 | Chen et al. |
| 2001/0036302 A1* | 11/2001 | Miller .................. G06T 3/0068 382/128 |
| 2003/0112922 A1* | 6/2003 | Burdette .............. A61B 6/5247 378/65 |
| 2006/0074292 A1 | 4/2006 | Thomson et al. |
| 2008/0081991 A1 | 4/2008 | West |
| 2009/0279739 A1 | 11/2009 | Kaus et al. |
| 2010/0049036 A1 | 2/2010 | Kimh |
| 2012/0163687 A1* | 6/2012 | Plakas .................. G06T 7/0038 382/131 |

OTHER PUBLICATIONS

Bol, G. H., et al.; Simultaneous multi-modality ROI delineation in clinical practice; 2009; Computer Methods and Programs in Biomedicine; 96(2)133-140.

Fox, J. L., et al.; Does Registration of PET Planning CT Images Decrease Interobserver and Intraobserver Variation in Delineating Tumor Volumes for Non-Small-Cell Lung Cancer?; 2005; Int. Journal of Radiation: Oncology Biology Physics; 62(1)70-75.

Zhang, G. G., et al.; Dose mapping: Validation in 4D dosimetry with measurements and application in radiotherapy follow-up evaluation; 2008; Computer Methods and Programs in Biomedicine; 90(1)25-37.

\* cited by examiner

CORRELATED IMAGE MAPPING POINTER

CROSS REFERENCE TO RELATED APPLICATIONS

This application is a national filing of PCT application Serial No. PCT/IB2012/051084, filed Mar. 8, 2012, published as WO 2012/123861 A1 on Sep. 20, 2012, which claims the benefit of U.S. provisional application Ser. No. 61/452,802 filed Mar. 15, 2011, which is incorporated herein by reference.

The present application relates generally to image registration. It finds particular application in conjunction with radiation therapy, and will be described with particular reference thereto. However, it is to be understood that it also finds application in other usage scenarios, and is not necessarily limited to the aforementioned application. For example, it finds application in visually analyzing an image registration mapping, in certain image studies, in monitoring progress of a treatment regimen or advancement of a medical condition, in planning a treatment course, and the like.

In radiation therapy, spatially targeted dosages of radiation are applied to tumors or other regions containing cancerous or malignant tissue. Growing and rapidly multiplying cancer cells tend to be more susceptible to damage from radiation, as compared with normal cells, such that dosages administrated by proper planning preferentially kill cancerous or malignant tissue. Nonetheless, radiation is harmful to both malignant and healthy cells, so precise spatial targeting of the radiation is important for applying effective radiation therapy to the malignancy while limiting collateral damage to healthy tissue. To precisely target radiation, radiation therapy is planned in advance for a patient based on images acquired of the patient. Typically, computed tomography (CT) imaging is used for radiation therapy planning. However, other imaging modalities, such as magnetic resonance (MR) or positron emission tomography (PET), can additionally or alternatively be used.

While planning radiation therapy, a tumor or other target is identified and delineated in the images, along with organs at risk (OARs) or other regions whose radiation dosage must be limited. Typically, this is performed by drawing a contour (or trajectory) around the tumor or other target and contours (or trajectories) around the OARs or other regions. Further, an oncologist or other clinician provides radiation plan parameters. The radiation plan parameters typically include a minimum or target dose to be delivered to the tumor or other target, maximum permissible doses for the OARs or other regions, and the like. The contoured tumor or other target and the contoured OARs or other regions, together with the radiation therapy plan parameters and known information about radiation attenuation or absorption characteristics of the various tissues, serve as inputs to optimize radiation delivery.

To facilitate radiation therapy planning, image registration is an important tool. Image registration seeks to find transformations and/or deformations that best align objects of interest (OOIs), such as regions of interest (ROIs) and points of interest (POIs), of a current image to an earlier image. Some applications include contour (or trajectory) propagation; mapping PET and/or CT images to a planning CT; dose accumulation; and the like. It can be used for one or more of adaptive planning events during the course of therapy; 4D planning and/or optimization; interfraction and/or intrafaction planning and/or optimization; composite planning; multimodality treatment plan generation; and the like. In the case of adaptive planning, the workflow typically begins with a user propagating a treatment plan and OOIs to a new image acquired during the course therapy. The structures can be propagated to the new image using an image registration mapping, such as a deformation vector field (DVF), created using an image registration algorithm. Doses on the new image can then be computed and accumulated using the image registration to map doses to the desired coordinate frame, since all doses have to be mapped to the same coordinate frame for accumulation. The accuracy and precision of this mapping is very important to minimize errors introduced into the accumulated dose.

Current tools used for analyzing an image registration mapping display structures, such as contours, on the registered image. However, structures may not be sufficient for certain regions of particular concern. For example, viewing contours only shows surfaces and doesn't give real time feedback. In addition shearing of a surface is very difficult to detect. Further, current tools used for analyzing an image registration overlay the current image on an earlier image. However, this does not give a visualization of a transformation between the images. Further, images often lose sharpness and may be hard to visually map to the original image. Even more, current tools used for analyzing an image registration display the two images side-by-side. For example, some tools apply a rectangular grid to one image and then apply the same grid to the other image in a warped form to reflect the deformations and/or transformations that occur during image registration. As another example, arrows are drawn between corresponding voxels of the two images. However, these approaches are not intuitive and do not provide a direct visualization of the image registration mapping.

The present application provides a new and improved systems and methods for visually analyzing an image registration which overcomes the above-referenced problems and others.

In accordance with one aspect, a system for assessing an image registration mapping is provided. The system includes a display and one or more processors. The processors are programmed to receive a first image and a second image and obtain an image registration mapping from the first image to the second image. The processors are further programmed to display the first image adjacent to the second image on the display and obtain one or more reference image locations. Each defined in the coordinate frame of one of the first image and the second image. Even more, the processors are programmed to highlight the corresponding reference image location in both the first and second image. The correlated image locations are determined using the image registration mapping.

In accordance with another aspect, a method for assessing an image registration mapping is provided. A first image and a second image are received. An image registration mapping from the first image to the second image is also obtained. The first image is displayed adjacent to the second image and one or more reference image locations are obtained. Each of the reference image locations are defined in the coordinate frame of one of the first image and the second image. Thereafter, each of the reference image locations are highlighted on the one of the first image and the second image, and a correlated image location is highlighted for each of the reference image locations in the other one of the first image and the second image. The correlated image locations are determined using the image registration mapping.

One advantage resides in that any feature on an image can be mapped in real time, including structure surfaces, internal points of interest, etc.

Another advantage resides in that coding, such as color coding, can be employed to show shearing effects of a surface.

Another advantage resides in that a user is shown a mapping between current and earlier images without transforming one of the images into registration with the other.

Another advantage resides in reduced processing time.

Another advantage resides in facilitating a user evaluation of the effectiveness of radiation therapy.

Still further advantages of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

Figure 1:
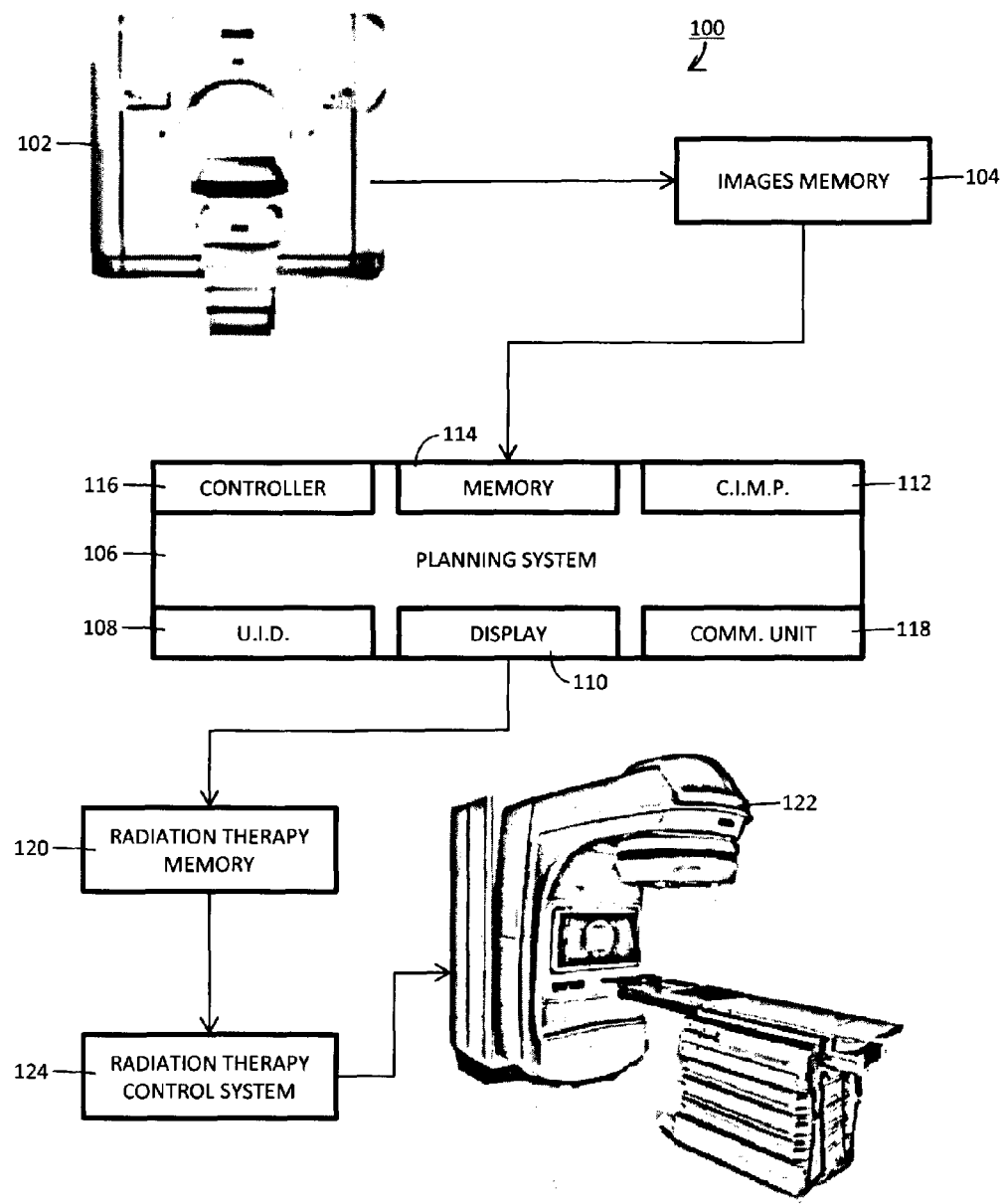
FIG. 1 illustrates a block diagram of a radiation therapy system according to aspects of the present disclosure.

With reference to FIG. 1, a radiation therapy system 100 for treating patients is provided. The radiation therapy system 100 includes one or more imaging modalities 102 suitable for acquiring images embodying objects of interest (OOIs), such as regions of interest (ROIs) and points of interest (POIs), within the patients. The imaging modalities 102 suitably include a computed tomography (CT) scanner. However, the imaging modalities 102 can additionally or alternatively include one or more of a positron emission tomography (PET) scanner, a magnetic resonance (MR) scanner, a single photon emission computed tomography (SPECT) scanner, and the like.

Images acquired from the imaging modalities 102 are typically three-dimensional images. However, two-dimensional images are contemplated. Three-dimensional images typically include a plurality of two-dimensional images, hereafter referred to as slices. Further, images acquired from the imaging modalities 102 are stored in an image memory 104. Typically, the image memory 104 is a central records storage system. However, it is contemplated that the image memory 104 is local to the imaging modalities 102 or another component of the radiation therapy system 100. Insofar as the image memory 104 is remote from the imaging modalities 102, the imaging modalities 102 are suitably connected therewith via a communications network, such as a local area network (LAN).

A planning system 106 of the radiation therapy system 100 receives images, typically planning images, for each of the patients and employs the images to generate and/or update radiation therapy treatment plans (RTPs) and/or to perform post-treatment analysis of RTPs. A planning image is an image used to generate and/or update an RTP. Further, post-treatment analysis seeks to assess the effectiveness of an RTP. If the RTP was effective, the tumors or other targets will have diminished in size and/or disappeared. Typically, the images are acquired from the image memory 104 and/or the imaging modalities 102. However, the images can be acquired from other sources. Further, the planning images are typically received electronically via a communications network. However, other means of receiving the planning images are contemplated.

To generate an RTP for a patient, the planning system 106 receives one or more planning images before radiation therapy. The planning images are suitably focused on one or more tumors or other targets of the patient to be treated or observed. Upon receiving the planning images, a contour (or trajectory) is identified around each of the tumors or other targets and one or more OARs or other regions. Contouring is used to delineate between the tumors or other targets and the OARs or other regions. An oncologist or other clinician suitably performs the contouring. However, automated and semi-automated approaches are contemplated. Insofar as a clinician performs the contouring, the clinician suitably employs one or more user input devices 108 to identify the contours on a graphical user interface presented via a display 110. For example, the graphical user interface can display a planning image and allow the clinician to draw or mark the contours on the planning image using the user input devices 108.

In addition to identifying the contours, radiation plan parameters are defined for the contoured regions. Suitably, the clinician or oncologist defines the radiation plan parameters via the graphical user interface. For example, the clinician or oncologist defines the radiation plan parameters using the user input devices 108. However, as with contouring, automated approaches are contemplated. The radiation plan parameters typically include minimum or target doses to be delivered to the tumors or other targets, maximum permissible doses for the OARs or other regions, and the like. The radiation therapy plan parameters, together with known information about radiation attenuation or absorption characteristics of the various tissues and the contoured tumor or other target and the contoured OARs or other regions, are used to generate the RTP.

In certain embodiments, the planning system 106 receives a plurality of planning images before radiation therapy and employs these images to generate the RTP. One challenge, however, is that these images can employ different coordinate frames due to, for example, the use of different imaging modalities, temporal disparity, and the like. For example, the planning system 106 can receive a planning image generated using a CT imaging modality and a planning image generated using a PET imaging modality. To remedy this, a correlated image mapping pointer (CIMP) module 112 of the planning system 106 can be employed to allow oncologist or other clinician to intuitively view and correlate the images.

The CIMP module 112, in conjunction with the display 110 and the user input devices 108, allow an oncologist or clinician to simultaneously visualize image locations in two different images in a correlated manner using an image registration mapping therebetween generated using an image registration algorithm. The different images are displayed adjacent (e.g., side by side) on the display 110. The oncologist or other clinician then selects image locations in the images using the user input devices 108. When the oncologist or other clinician selects an image location within one of the images, the CIMP module 112, in real time, highlights both the selected image location and the correlated image location in the other image, so the oncologist or other clinician can visualize the correlation between the images. As discussed below, highlighting is suitably performed using indicators, such as an arrow, a gun sight, etc.

In certain embodiments, the CIMP module 112 is employed for contouring and/or integrated with the graphical user interface employed for contouring. For example, the CIMP module 112 can be activated via a menu item of the graphical user interface. Where the CIMP module 112 is employed for contouring, two different planning images are displayed on the graphical user interface. For example, a planning image acquired from a CT imaging modality is displayed alongside a planning image acquired from an MR imaging modality. Thereafter, the oncologist or other clinician draws the contours on one of the images and the CIMP module 112, in real time, highlights the image locations defined by the contours on both images using an image registration mapping between the images. In certain embodiments, it is contemplated that the oncologist or other clinician can draw the contours using both images. For example, it is contemplated that the oncologist or other clinician begins drawing a contour in one of the images and finishes drawing it on the other image.

During each radiation therapy session, the cumulative dose of radiation delivered to tumors or other targets and OARs or other regions is determined. As the therapy session progresses, the tumors or other targets typically shrink allowing the OARs or other regions to shift, potentially causing errors in the accumulated dose calculations, and the trajectories of the radiation therapy beams. To maintain accuracy, the RTP is periodically updated.

To update an RTP for a patient, the planning system 106 receives one or more new planning images. For example, the planning system 106 receives planning images after each, or a predetermined number of, radiation therapy sessions. As above, the planning images are suitably focused on the tumors or other targets of the patient. Upon receiving a new planning image, or upon receiving a predetermined number of new planning images, the contours (or trajectories) and/or the doses of the RTP are typically updated. One challenge with updating an RTP is that it is defined in terms of the coordinate frame of the planning images initially used to define the RTP. To remedy this, the CIMP module 112 can again be employed.

In updating the contours of an RTP, the new planning images are displayed alongside the original planning images employed to generate the RTP. Further, the CIMP module 112 highlights image locations to which the contours of the RTP relate in the original planning images and highlight the correlated image locations in the new planning images using an image registration mapping between the original planning images and the new planning images. Advantageously, this allows the oncologist or other clinician to visualize the corresponding image locations. Suitably, the image locations are highlighted using indicators that trace the corresponding image location. In certain embodiments, the oncologist or other clinician can modify the contours using the user input devices 108. For example, the oncologist or clinician can modify the size and/or shape of the indicators representing the contours and see, in real time, the effect on the other displayed image.

In updating the doses of an RTP, the new planning images can be mapped to the coordinate frame employed during the generation of the RTP using an image registration mapping. Thereafter, dosing data from the new planning images and/or the RTP is accumulated and graphically represented as an accumulated dose image. This image is then displayed alongside the original planning images employed to generate the RTP using the CIMP module 112. The CIMP module 112 can highlight image locations to which the contours of the RTP relate in the original planning images and highlight the correlated image locations in the accumulated dose image, so the oncologist or other clinician can visualize the accumulated dose and optimize dosing in future radiation therapy sessions based thereon.

To perform a post-treatment analysis of an RTP, the planning system 106 receives one or more images after the RTP has completed. As above, the images are suitably focused on the tumors or other targets of the patient. Upon receiving the new images, the CIMP module 112 is suitably employed to compare the new images with the planning images associated with the RTP. In that regard, the CIMP module 112 is employed to display the new images alongside the planning images employed to generate the RTP. Further, the CIMP module 112 highlights the image locations to which the contours of the RTP relate in the planning images and highlights the correlated image locations in the new images, so the oncologist or other clinician can visualize the image locations. If the RTP is effective, the correlated image locations for the tumors or other targets should diminish in size or disappear.

The planning system 106 suitably includes one or more memories 114 and one or more process-based controllers 116. The memories 114 store executable instructions for controlling a processor of the processor-based controllers 116 to perform one or more of the abovenoted functions of the planning system 106. Further, in certain embodiments, the CIMP module 112 is embodied by executable instructions stored in, for example, the memories 114. The process-based controllers 116 execute the executable instructions stored on the memories 114 to carry out the functions associated with the planning system 106. Where the planning system 106 is operative to receive images from a communications network and/or store RTPs over the communications network, the planning system 106 further includes one or more communications units 118 facilitating communication between the processor-based controllers 116 and the communications network.

The RTPs generated and/or updated by the planning system 106 are stored in a radiation therapy plan memory 120. Typically, the radiation therapy plan memory 120 is the central records storage system. However, it is contemplated that the radiation therapy plan memory 120 is local to the planning system 106 or another component of the radiation therapy system 100. Insofar as the radiation therapy plan memory 120 is remote from the planning system 106, the radiation therapy plan memory 120 is suitably connected therewith via a communications network, such as a local area network (LAN).

At a scheduled day and time for a radiation therapy session of an RTP, a radiation therapy apparatus 122 is employed to deliver therapeutic radiation to the patient. The radiation can include x-rays, protons, high-intensity focused ultrasound (HIFU), and the like in which the patient is treated with an external beam radiation, a proton or other ion beams, and high-intensity focused ultrasound, and other ablation or therapy techniques. Suitably, the radiation therapy apparatus 122 is controlled by a radiation therapy control system 124 in accordance with the RTP stored in the radiation therapy plan memory 120. For example, in the illustrated embodiment, the radiation therapy delivery apparatus 122 is a linear accelerator (LINAC), and the radiation therapy control system 124 operates multi-leaf collimator (MLC) or other radiation beam profile-shaping apparatus of the LINAC to modulate beam intensity and profile as the linear accelerator is moved around the subject, so as to deliver a radiation dose distribution into the subject that provides the desired integrated radiation dosage to the target feature while suitably limiting or constraining radiation exposure of sensitive critical features in accordance with the RTP.

Figure 2:
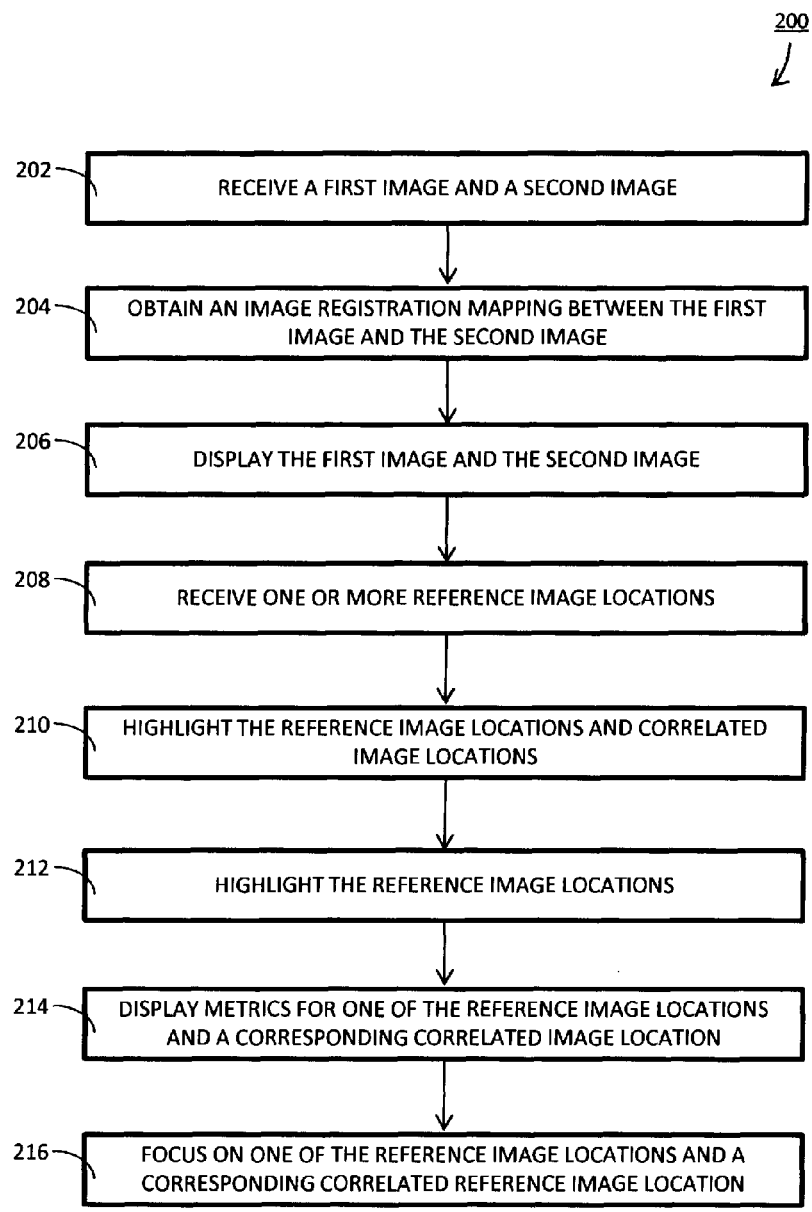
FIG. 2 illustrates a block diagram of a method performed by a correlated image mapping pointer (CIMP) module according to aspects of the present disclosure.

With reference to FIG. 2, a block diagram 200 detailing the operation of the CIMP module 112 is illustrated. The CIMP module 112 receives 202 a first image, such as a planning image, and a second image, such as a current image. The first image and/or the second image are suitably generated using the imaging modalities 102. However, images generated by other means are contemplated. Further, the first image and/or the second image are suitably three-dimensional, but two-dimensional images are contemplated. In certain embodiments, one of the first image and the second image is an image of accumulated dosing information.

Upon receiving the first image and the second image, the CIMP module 112 obtains 204 an image registration mapping that maps the first image to the second image. The image registration mapping 112 describes the transformations and/or deformations that transform or deform the first image to the coordinate frame of the second image. Suitably, the image registration mapping is obtained by generating the image registration mapping using an image registration algorithm. However, it is also contemplated that the CIMP module 112 obtains the image registration mapping from an external source.

The image registration algorithm can be a rigid or a non-rigid image registration algorithm. Further, the image registration algorithm can, but need not, be inverse consistent. Where the image registration algorithm is inverse consistent, an image registration mapping that maps the first image to the second image is the same as an image registration mapping that maps the second image to the first image. In certain embodiments, the image registration algorithm generates the image registration map by identifying corresponding points and/or features in the first image and the second image. Once these points and/or features are identified and paired between the images, they are used to compute a coordinate transformation and/or deformation that maps the coordinate locations in one of the images to a corresponding location in the other image and align them accordingly into one coordinate frame.

Additionally, upon receiving the first image and the second image, the first image and the second image are displayed 206 on a graphical user interface presented to an oncologist or other clinician via the display 110. Typically, the first image and the second image are displayed in a side-by-side configuration, but other configurations are contemplated. Further, the first image and the second image are typically displayed two-dimensionally, but it is contemplated that the first image and the second image are displayed three-dimensionally. In certain embodiments, where the first image and the second image are three-dimensional images and displayed two-dimensionally, the oncologist or other clinician can move through slices thereof using the user input devices 108. For example, the oncologist or clinician can use the user input devices 108 to manipulate scrollbars linked to the slices of the images.

The CIMP module 112 further obtains 208 one or more reference image locations within the coordinate frame of the first image and/or the second image. A reference image location is defined by one of a point, a plurality of points, a plurality of connected points, a contour (or trajectory), a region of interest of at least three-dimensions, or the like, within an image. The reference image locations are suitably obtained from the user input devices 108. For example, the oncologist or other clinician can select a reference image location, such as a point or three-dimensional region of interest, on the first image or the second image using the user interface devices 108. However, it is contemplated that the reference image locations could be obtained from other sources. For example, the reference image locations can be obtained from the contours (or trajectories) defined during the contouring process.

Once the reference image locations are obtained or, in certain embodiments, contemporaneous therewith, the CIMP module 112 highlights 210 each of the reference image locations on the displayed image to which it relates. Further, for each of the reference image locations, the CIMP module 112 highlights 212 the corresponding image location in the other displayed image. For example, if a reference image location is defined within the coordinate frame of the first image, the reference image location is highlighted in the first image and the correlated image location is highlighted in the second image. Highlighting 212 the corresponding image location suitably includes calculating the correlated image locations in real time using the image registration mapping obtained above, as described below.

If the image registration mapping is in the coordinate frame of a first image and the image registration algorithm is not inverse consistent, a position in a second image ($P_2$) corresponding to a position in the first image ($P_1$) can be determined by adding image registration mapping (IRM) to the position of the first image ($P_1$) and transforming the sum into the coordinate frame of the second image, as shown below.

$$P_2 = (P_1 + IRM) X^{Image1} T_{Image2}, \quad (1)$$

where $X^{Image1}$ is the coordinate frame of the first timage and $T_{Image2}$, is the transformation from the coordinate frame of the first image to the coordinate frame of the second image.

If the image registration mapping is in the coordinate frame of a second image and the image registration algorithm is not inverse consistent, a position in the second image ($P_2$) corresponding to a position in the first image ($P_1$) can be determined by transforming position in the first image to the coordinate frame of the second image and adding the image registration mapping (IRM) to transformed position of the first image, as shown below.

$$P_2 = (P_1 X^{Image1} T_{Image2}) + IRM \quad (2)$$

If the image registration algorithm employed to generate the image registration mapping is inverse consistent, either one of equations (1) and (2) can be employed to determine a position in the second image ($P_2$) corresponding to a position in the first image ($P_1$). As noted above, when an image registration algorithm is inverse consistent, an image registration mapping from a first image to a second image is the same as an image registration mapping from the second image to the first image.

To highlight image locations, indicators incorporated into the first image and the second image are suitably employed. Where the images are three-dimensional, the indicators can span multiple slices. An indicator is typically a colored trace of an image location, where the color is such that there is a high contrast between it and the image it is incorporated into. In certain embodiments, where an indicator is employed to highlight an image location defined by a point, the indicator can be, for example, an arrow, a gun sight, or the like. Further, in certain embodiments, where an indicator is employed to highlight a multi-dimensional image location (such as an image location defined by a contour), the indicator can employ a gradient of colors or shades of color (e.g., red to green), line thickness, or other variation indicators. The gradient is advantageous because it makes it easier to identify shearing.

An indicator associated with a reference image location (i.e., a reference indicator) is suitably visually the same as an indicator associated with the correlated image location of the reference image location (i.e., a correlated indicator). Advantageously, this allows visual correlation between a reference image location and a correlated image location. For example, where a reference indicator traces a reference image location with red, the correlated indicator traces the correlated image location with red.

In certain embodiments, where only a single reference image location is obtained, the reference image location and the correlated image location are focused 214 on within displayed images. For example, if a reference image location is a point in the first image and both the first image and the second image are three-dimensional, the correlated image location in the second image would be focused on by changing to the slice of the second image embodying the image location. Additionally or alternatively, in certain embodiments, where only a single reference image location is obtained, standard metrics, typically including at least one of grey value differences, coordinates, and location correlations, for the reference image location and a corresponding correlated image location are displayed 216 on the display 112.

Additionally or alternatively, in certain embodiments, the indicators are selectable using, for example, the user input devices 108. Selection can be employed to move the indicators and corresponding image locations. For example, if a clinician selects a reference indicator and drags it on the image to which it relates, the CIMP module 112 receives movement data. This movement data is then used to move the reference image location. Since the reference indicator is associated with the correlated indicator, the correlated indicator would also move. Selection can additionally or alternatively be employed to focus 214 on the image location of the selected indicator, as above. Selection can additionally or alternative be employed to resize and/or reshape image locations associated with selected indicators. For example, if a clinician selects a portion of a reference indicator and drags it on the image to which it relates, the CIMP module 112 receives resize and/or reshape data. This resize and/or reshape data is then used to resize and/or reshape the image location associated with the selected indicator. Selection can additionally or alternatively be employed to display 216 standard metrics, as above. For example, standard metrics are displayed for the selected indicator.

Additionally or alternatively, in certain embodiments, the indicators can be employed to correct the image registration mapping. One or more reference image locations and/or correlated image locations can be held fixed. Thereafter, the corresponding reference image locations and/or correlated image locations in the other image can be manipulated to identify the correct mapping. For more information, attention is directed to U.S. Patent Application No. 61/416,318, entitled "Interactive Deformation Map Corrections", filed Nov. 23, 2010, by Bzdusek et al., incorporated herein by reference in its entirety.

Figure 3:
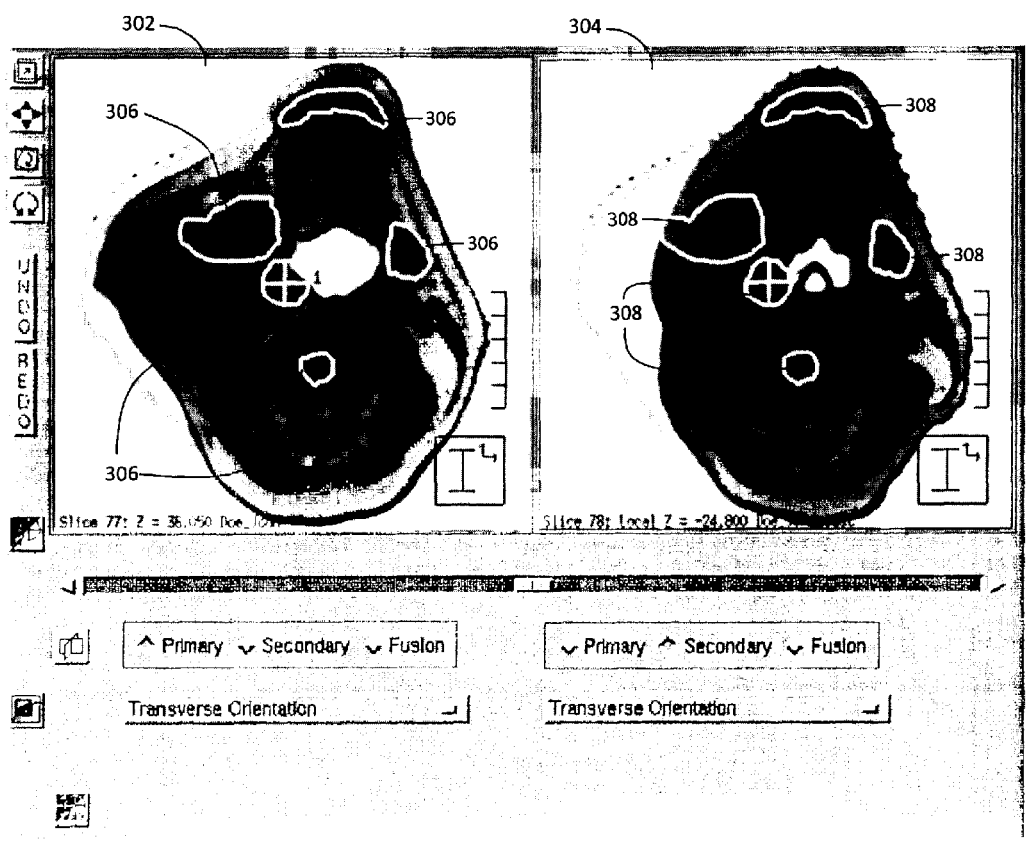
FIG. 3 illustrates a graphical user interface employed by a CIMP module according to aspects of the present disclosure.

With reference to FIG. 3, one embodiment of a graphical user interface suitably employed by the CIMP module 112 is provided. Therein, a first image 302 is shown side-by-side with a second image 304. Further, a plurality of reference indicators 306 are shown in the first image 302 and a plurality of correlated indicators 308 are shown in the second image 304. The reference indicators 306 and the correlated indicators 308 are shown as a gun sights and contours (or trajectories). The gun sights identify an image location defined by a point, and the contours (or trajectories) define the boundary of a region of interest. Selection of one of the reference indicators or one of the correlated indicators allows the corresponding image location to be varied by moving the selected indicator. This in turns translates into movement of the correlated image location and the indicator associated therewith. For example, selection of the gun sight in the first image 302 allows a clinician or oncologist to drag it on the first image 302 and see the correlated image location in the second image 304 via the gun sight in the second image 304.

While the CIMP module 112 was described in the context of a radiation therapy system, it is to be appreciated that the CIMP module 112 has broader applicability. In that regard, the CIMP module 112 can be employed in any usage scenario involving image registration. For example, the CIMP module 112 can be employed to assess the quality of an image registration mapping between images. This is important because often times a physician draws a contour (trajectory) of a tumor on a PET/CT scan and wants to map the contour to a planning CT. Accuracy of the deformation map is vital to mapping the delineation to the planning CT.

As used herein, a memory includes one or more of a non-transient computer readable medium; a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth. Further, as used herein, a processor-based controller includes one or more of a microprocessor, a microcontroller, a graphic processing unit (GPU), an application-specific integrated circuit (ASIC), a field-programmable gate array (FPGA), and the like; a user input device includes one or more of a mouse, a keyboard, a touch screen display, one or more buttons, one or more switches, one or more toggles, and the like; and a display includes one or more of a LCD display, an LED display, a plasma display, a projection display, a touch screen display, and the like.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

Having thus described the preferred embodiments, the invention is now claimed to be:

1. A system for visualizing an image registration mapping, said system comprising:
   a display; and,
   one or more processors programmed to:
   receive a first image including a first coordinate frame and a second image including a second coordinate frame that is different from the first coordinate frame;
   obtain an image registration mapping from the first image to the second image;
   display the first image adjacent to the second image on the display;
   obtain one or more reference image locations, each defined in the coordinate frame of one of the first image and the second image;

highlight each reference image location on the one of the first image and the second image; and, highlight a correlated image location for each reference image location in the other one of the first image and the second image, wherein the correlated image locations are determined using the image registration mapping;

wherein the image registration mapping includes:

adding the image registration mapping to the reference image location of one of the first image and the second image and transforming the sum into the coordinate frame of another one of the first image and the second image when the image registration mapping is in the coordinate frame of the one of the first image and the second image; and transforming the reference image location to the coordinate frame of the other of the first image and the second image and adding the image registration mapping when the image registration mapping is in the coordinate frame of the other one of the first image and the second image.

2. The system according to claim 1, further including:
one or more user input devices;
wherein the one or more reference image locations are obtained from the user input devices;
wherein the image registration is calculated based on one of the equations $$P_y=(P_x+\text{IRM})X^{Imagex}*T_{Imagey}; \text{ or}$$

$$P_y=(P_x*X^{Imagex}*T_{Imagey})+\text{IRM};$$

wherein $P_y$ is a position of one of the first or second images, $P_x$ is a position in the other of the first or second images, IRM is the image registration mapping, $X^{Im}_{agex}$ is the coordinate frame of the other of the first or second images, and $T_{Imagey}$ is a transformation from the coordinate frame of the one of the first and second images to the coordinate frame of the other of the first and second images.

3. The system according to claim 1, wherein each of the reference image locations and the correlated image locations is defined by one of a point, a plurality of points, a plurality of connected points, a contour, and a region of interest of at least three-dimensions.

4. The system according to claim 1, wherein the one or more processors are further programmed to highlight each of the reference image locations and the correlated image locations using an indicator incorporated into the first image and/or the second image.

5. The system according to claim 4, wherein the indicator for a reference image location is the same as an indicator for a corresponding correlated image location.

6. The system according to claim 4, further including:
one or more user input devices;
wherein the one or more processors are further programmed to:
receive a selection of one of the indicators from the user input devices, where the selected indicator is associated with one of the first image and the second image;
receive resize and/or movement data from the user input devices;
resize and/or move the selected indicator based on the resize and/or movement data to modify the associated image location; and,
resize and/or move an indicator associated with the selected indicator in the other one of the first image and the second image to match the selected indicator using the image registration mapping.

7. A radiation therapy system, said system comprising:
one or more imaging modalities;
the planning system according to claim 1 that generates and/or updates radiation treatment plans (RTPs) and/or performs post-treatment analysis on radiation treatment plans;
a radiation therapy apparatus that delivers radiation in accordance with RTPs generated and/or updated by the planning system.

8. A method for visualizing an image registration mapping, said method comprising:
receiving a first image including a first coordinate frame and a second image including a second coordinate frame that is different from the first coordinate frame;
obtaining an image registration mapping from the first image to the second image;
displaying the first image adjacent to the second image;
obtaining one or more reference image locations, each defined in the coordinate frame of one of the first image and the second image;
highlighting each reference image location on the one of the first image and the second image;
highlighting a correlated image location for each reference image location in the other one of the first image and the second image, wherein the correlated image locations are determined using the image registration mapping;
wherein when the image registration mapping is in the coordinate frame of the one of the first image and the second image, the image registration is calculated based on one of the equations $$P_y=(P_x+\text{IRM})X^{Imagex}*T_{Imagey}; \text{ or}$$

$$P_y=(P_x*X^{Imagex}*T_{Imagey})+\text{IRM};$$

wherein $P_y$ is a position of one of the first or second images, $P_x$ is a position in the other of the first or second images, IRM is the image registration mapping, $X^{Im}_{agex}$ is the coordinate frame of the other of the first or second images, and $T_{Imagey}$ is a transformation from the coordinate frame of the one of the first and second images to the coordinate frame of the other of the first and second images.

9. The method according to claim 8, wherein the obtaining the image registration includes:
calculating the image registration mapping using an image registration algorithm.

10. The method according to claim 8, wherein the one or more reference image locations are obtained via the user input devices.

11. The method according to claim 8, wherein obtaining the one or more reference image locations includes:
receiving contours; and,
employing image locations corresponding to the contours as reference image locations.

12. The method according to claim 8, wherein each of the reference image locations and the correlated image locations is defined by one of a point, a plurality of points, a plurality of connected points, a contour (or trajectory), and a region of interest of at least three-dimensions;

wherein when the image registration mapping is in the coordinate frame of the one of the first image and the second image, the image registration is calculated based on the equation $$P_2 = (P_1 + \text{IRM}) X^{Image1} * T_{Image2};$$

wherein $P_2$ is a position in the second image, $P_1$ is a position in the first image, IRM is the image registration mapping, $X^{Image1}$ is the coordinate frame of the first image, and $T_{Image2}$ is a transformation from the coordinate frame of the first image to the coordinate frame of the second image, and wherein when the image registration mapping is in the coordinate frame of the other one of the first image and the second image, the image registration is calculated based on the equation $$P_2 = (P_1 * X^{Image1} * T_{Image2}) + \text{IRM};$$

wherein $P_2$ is a position in the second image, $P_1$ is a position in the first image, IRM is the image registration mapping, $X^{Image1}$ is the coordinate frame of the first image, and $T_{Image2}$ is a transformation from the coordinate frame of the first image to the coordinate frame of the second image.

13. The method according to claim 8, wherein each of the reference image locations and the correlated image locations are highlighted using an indicator incorporated into the first image or the second image.

14. The method according to claim 13, wherein the indicator for a reference image location is the same as an indicator for a corresponding correlated image location.

15. The method according to claim 13, wherein the indicators at least one of trace corresponding image locations and are color coded, shaded, have varying line thicknesses, or other variation indicators.

16. The method according to claim 13, further including:
receiving a selection of one of the indicators from one or more user input devices, where the selected indicator is associated with one of the first image and the second image;
receiving resize and/or movement data from the user input devices;
resizing and/or moving the selected indicator based on the resize and/or movement data to modify the associated image location; and,
resizing and/or moving an indicator associated with the selected indicator in the other one of the first image and the second image to match the selected indicator using the image registration mapping.

17. The method according to claim 8, further including:
focusing on one of the reference image locations and a corresponding correlated reference image location.

18. The method according to claim 8, further including:
displaying metrics, including at least one of grey value differences, coordinates, and location correlations, for one of the reference image locations and a corresponding correlated image location.

19. A non-transitory computer medium carrying software which controls one or more processors to perform the method according to claim 8.

20. A system for visualizing an image registration mapping, the system comprising:
one or more computer processors programmed to:
receive a first image, including a first coordinate frame, generated at one time and a second image, including a second coordinate frame that is different from the first coordinate frame, generated at another time;
determine an image registration mapping between the first image and the second image;
display the first image and the second image on a display device; and,
in response to a point on one of the first and second displayed images being denoted, indicating a corresponding point on the other of the first and second displayed images;
wherein the image registration mapping includes at least one of:
multiplying a transformed coordinate frame of a non-selected one of the first and second images to the sum of the image registration mapping and the reference image location of a selected one of the first and second images; and
multiplying a transformed coordinate frame of a non-selected one of the first and second images by the reference image location of a selected one of the first and second images and then adding the image registration mapping thereto.

* * * * *